Patented Feb. 11, 1930

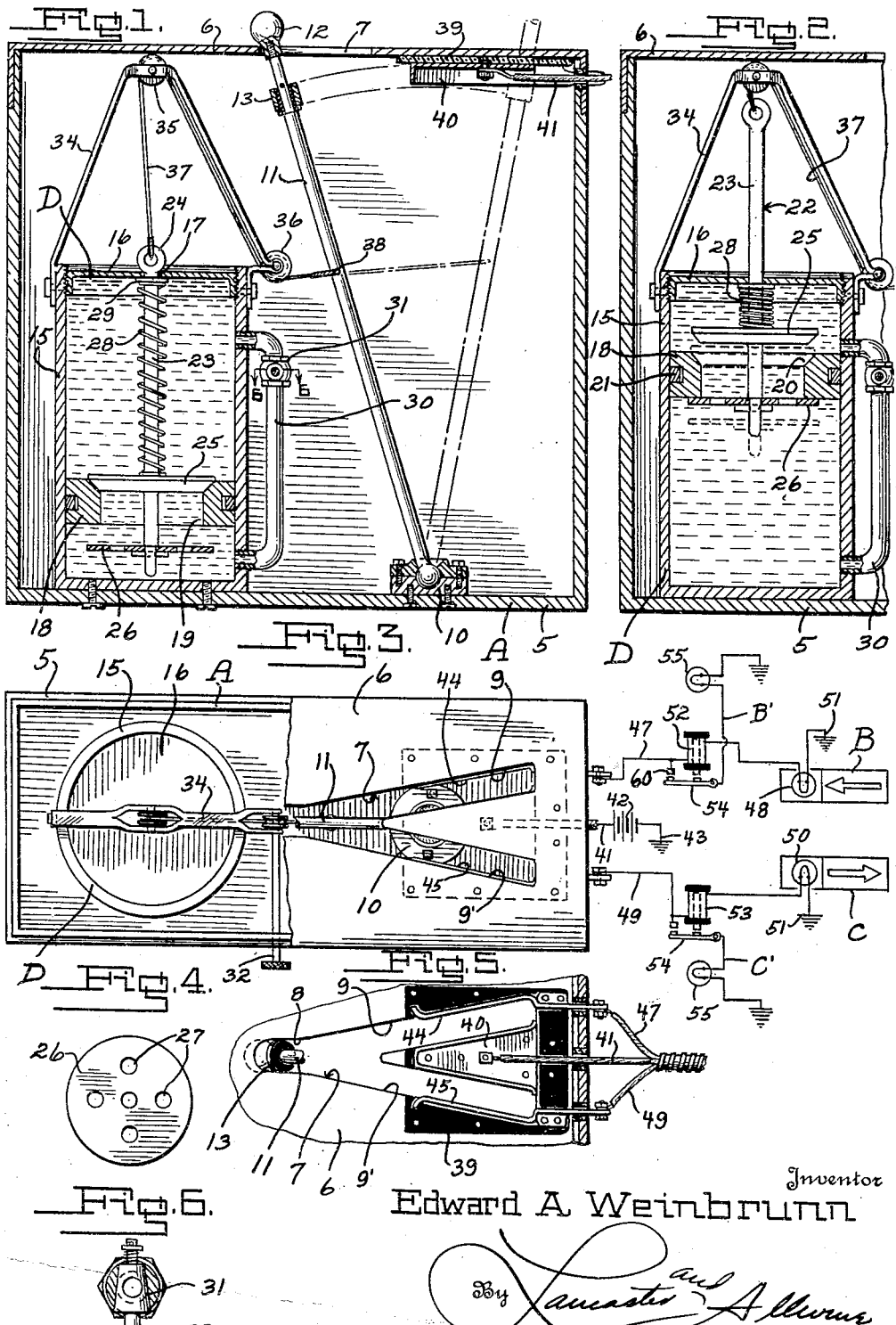

1,747,093

UNITED STATES PATENT OFFICE

EDWARD A. WEINBRUNN, OF CHARLOTTESVILLE, VIRGINIA

VEHICLE SIGNAL-CONTROL SWITCH

Application filed September 6, 1927. Serial No. 217,787.

The present invention relates to improvements in control switches for electric circuits, and the primary object of the invention is to provide an improved type of control switch which may be actuated for completing circuits thru a series of independent signal control circuits for predetermined periods of time.

A further object of the invention is to provide an improved vehicle signal control switch which when thrown to an on position will maintain a closed circuit thru the desired signal for a predetermined period of time and then be automatically actuated to an off position without further attention by the operator of the vehicle.

A further object of the invention is to provide a vehicle signal control switch embodying a movable switch arm which is readily movable into various positions for completing circuits thru independent signals, and which switch arm is slowly returned to an off position from either of its circuit closing positions by means of a return means which may be regulated for determining the length of time that an electric circuit will be completed thru either of the vehicle signals.

A further object of the invention is to provide a vehicle signal control switch embodying a switch arm and an actuating means for automatically returning the switch arm to an off position, with means so connecting the switch arm and its actuating means as to permit of the switch arm to be readily moved into various circuit closing positions regardless of the position of the actuating means.

A further object of the invention is to provide a vehicle signal embodying independent signals and a single control switch for the signals, and with means associated with the circuit of each signal for automatically indicating to the operator of the vehicle as to whether the signals are functioning.

Other objects and advantages of the invention will be apparent during the course of the following detailed description, taken in connection with the accompanying drawing, forming a part of this specification and in which drawing.

Figure 1 is a sectional view thru the improved time controlled switch and showing the parts in their normal off position.

Figure 2 is a fragmentary section thru the return means and showing the position of the movable parts thereof when the switch arm has been moved to a circuit closing position.

Figure 3 is a view showing a portion of the cover plate for the switch casing broken away and illustrating diagrammatically the manner in which the switch may be connected for independent operation of two vehicle signals.

Figure 4 is a plan view of the lift washer for the annular piston of the return means.

Figure 5 is a fragmentary plan view of the inner side of the cover plate and showing the manner in which the contact arms are associated therewith.

Figure 6 is an enlarged detail section on line 6—6 of Figure 1.

In the drawing, and wherein similar reference characters designate corresponding parts thruout the several views, the letter A designates the improved control switch shown operatively connected for completing circuits thru independent vehicle direction signals B and C, said signals having respectively associated therewith telltale indicator means B' and C' for informing the operator as to whether the signals are functioning properly upon actuation of the control switch.

Referring particularly to the specific construction of the improved control switch A, the same embodies a switch box or casing 5 which has been shown as being of substantially rectangular shape and provided with a removable cover plate 6. The casing 5 may of course be of any preferred shape and may be mounted at any desired location, say upon the instrument board of the vehicle so that the operator of the vehicle may have ready access to the switch for operating the same. The cover plate 6 is provided with a substantially Y-shaped guide slot 7 which extends in a general direction longitudinally of the cover plate and forms a main branch 8 from the forward end of which extend in V formation, angular branches 9 and 9' which preferably terminate short of the end of the cover plate.

Mounted at its lower end as by means of a suitable ball and socket joint 10 to the bottom wall of the casing 5 at a point vertically, substantially midway of the ends of the guide slot 7, is a switch lever or arm 11 the upper end of which projects thru the guide slot and carries a suitable knob 12 which may be grasped by the operator for swinging the switch arm. Thus it will be seen that by so having the switch arm 11 swivelly mounted at its lower end, that the arm may be readily guided into either of the angular branches 9 and 9' without creating a binding action at the pivotal point of the switch arm. A bridge or contact ring 13 is insulatively carried by the upper or free end portion of the switch arm 11 inwardly of the cover plate 6, and the object of this contact ring 13 will be subsequently set forth.

A return means D is provided for automatically returning the switch arm 11 thru a slow motion to an off position, and this return means embodies a closed chamber in the form of a cylinder 15 shown secured to the bottom wall of the casing 5 and closed at its upper end as by a threaded cap 16 provided with an axially disposed guide opening 17. This chamber or cylinder 15 is intended to be filled to full capacity with a liquid such as oil or any liquid which will not readily freeze and prevent operation of the return means. Mounted for reciprocatory movement in the cylinder 15 is an annular or ring-like piston 18 forming a circular opening 19 thru which communication is had with the cylinder at opposite sides of the piston. The upper end of the circular opening 19 is flared outwardly for forming a tapering valve seat 20, and the piston may be provided with an annular groove for receiving a suitable packing ring 21 for snugly engaging the inner wall of the cylinder 15.

Also mounted for reciprocatory movement in the cylinder 15 is a plunger 22 embodying a stem 23 which is adapted to have sliding movement in the axially disposed opening 17 of the closure cap 16, and this stem 23, outwardly of the cap 16 is preferably provided with an eye 24 which preferably engages with the cap when the plunger is in its fully retracted position. This plunger stem 23 at its inner end extends thru the circular opening 19 of the piston 18 and has mounted thereon a valve head 25 for seating engagement upon the annular valve seat 20 so as to close communication thru the opening 19 when the plunger is actuating for returning the switch arm 11 to its normal off position. Carried by the inner end of the stem 23 at the opposite side of the annular piston 18 from that at which the valve head 25 is disposed, and spaced a greater distance from the valve head than the thickness of the piston, is a lift washer 26 which is provided with a suitable number of apertures 27 thru which the liquid may pass when the washer is drawn into engagement with the under side of the annular piston. As will be observed in Figures 1 and 2, this washer 26 is of a diameter greater than that of the circular opening 19 thru the piston 18, and thus is prevented from being drawn thru the opening 19 when the plunger is moved outwardly for imparting movement to the piston. While the stop or lift 26 has been shown as being in the form of a perforated disc, the same if so desired may be in the form of a spider with the arms of greater length than the diameter of the opening 19. Encircling the plunger stem 23 is a spiral spring 28 one end of which bears against the inner side of the closure cap 16 and the opposite end of which bears upon the valve head 25 in a manner for normally urging the valve head from the closure cap 16 as will readily be apparent. A suitable packing gland as at 29 may be provided where the plunger stem passes thru the guide opening of the closure cap for preventing escape of liquid from the cylinder.

Opening into the cylinder 15 at points adjacent each end thereof and past the limit of movement of the piston 18 in either direction within the cylinder, is a by-pass passageway 30, and interposed in the passageway 30 is a regulating valve 31 which may be operated as by the control handle 32 for regulating the flow of liquid thru the by-pass passageway to opposite sides of the piston 18. The valve 31 may be of any preferred type which may be operated for providing a restricted passageway between the opposite ends of the by-pass where it opens into the cylinder 15.

Mounted in the casing 5, and preferably secured to the upper end of the cylinder 15, is a suitable bracket 34 for rotatably supporting suitable sheaves 35 and 36, the sheave 35 being mounted substantially in alignment above the plunger stem 23 and the sheave 36 preferably being mounted below the sheave 35 and at an elevation substantially midway of the height of the switch arm 11. Trained over the sheaves 35 and 36 is a flexible cable 37 one end of which is connected with the eye 24 of the plunger stem 23 and the opposite end of which is connected with the intermediate portion of the switch arm 11 as at 38. This flexible cable 37 upon swinging of the switch arm 11 into an on position as shown by the dot and dash line showing in Figure 1, will cause the plunger 22 and piston 18 to be moved upwardly in the cylinder 15 to the position as shown in Figure 2.

Mounted upon the underside of the cover plate 6 at the angular branches 9 and 9' of the guide slot 7, is a block of insulation 39 having slots provided therein corresponding with the branches 9 and 9'. Mounted on the insulating block 39 between the branches 9 and 9′ is a substantially V-shaped contact block 40 having a lead wire 41 connected thereto, and which wire extends thru the casing 5 and leads to one terminal of an electric battery 42. As will be observed in Figure 5, this V-shaped contact block 40 extends for substantially the entire length of the angular branches 9 and 9′ but terminate short of the intersection of the angular branches with the main branch 8. The opposite terminal of the battery 42 to that terminal with which the conductor 41 is connected, is grounded thru a suitable conductor 43. Mounted upon the insulating block 39 at the opposite or outer edge of each of the angular branches 9 and 9′ are spring contact fingers 44 and 45 respectively, and which contact fingers are of a length equal to the angular side edges of the contact block 40 and are adapted to co-act with the contact block in a manner for completing independent electric circuits thru the individual vehicle signals. As an example, when the pivoted switch arm 11 is moved forwardly and directed into the angular branch 9, the contact ring 13 will engage the contact finger 44 and one side of the contact block 40 whereby the contact ring will form a bridge between the contacts 40 and 44, while when the switch arm is moved forwardly and directed into the angular branch 9′ the contact ring 13 acts as a bridge between the spring contact 45 and the opposite edge of the fixed contact block 40. It may here be stated that the contact ring 13 is intended to form a bridge between the contacts of the respective angular branches thruout the entire length of the elongated spring contact fingers and thus maintain a closed circuit thru the vehicle signals thruout substantially one-half of the swinging movement of the switch arm.

A conductor 47 is connected with the spring contact finger 44 and leads to an electric lamp 48 of the signal B, while a conductor 49 is connected with the spring contact finger 45 and leads to an electric lamp 50 of the signal C. The lamps 48 and 50 have their opposite terminals grounded as at 51. Connected in series in the conductor 47 is the winding of an electromagnet 52, while connected in series in the conductor 49 is the winding of an electro-magnet 53, and which magnets are intended to be energized when an electric circuit is completed for illuminating the lamps 48 and 50 respectively.

The indicator means B′ and C′ of the signals B and C respectively, each embodies a movable armature 54 which is intended to be actuated upon energization of its respective magnet for completing circuits thru suitable indicator lights 55 which may be arranged in clear view of the operator of the vehicle and preferably upon the instrument board of the vehicle. These lamps 55 and one of which is provided for each of the signals B and C may have differing characteristics of any suitable nature for corresponding with its respective signal. As an example, and when the operator moves the switch arm 11 for completing a circuit thru the lamp 48 of the signal B, the electro-magnet 52 is energized and attracts its armature 54 for completing a circuit thru its indicator lamp 55 thru movement of the armature 54 into contact with the contact block 60 which is connected in the conductor 47 between the electro-magnet 52 and the spring contact finger 44. Should the filament in the lamp 48 be broken, such will prevent a circuit being completed thru the electro-magnet 52 and thus its armature 54 will not be attracted by the magnet for completing a circuit thru the indicator lamp 55 and thus the operator will be informed that the signal B is not functioning. The indicator lamp 55 will further allow the operator to observe as to just what period of time the signals B and C remain lighted. Likewise, the indicator lamp 55 of the indicator means B′ will function for informing the operator as to the proper functioning of the signal C.

Referring now to the mode of operation of the improved control switch A for independently controlling circuits thru the independent signals B and C and causing either of said signals to remain in an operative or illuminated condition for a predetermined period of time, the operator, say when desiring to operate the signal B, grasps the knob 12 of the switch arm 11 and directs the same forwardly in the guide slot 7 into the angular branch 9 whereupon the contact ring 13 engages between the contacts 40 and 44 for completing a circuit thru the lamp 48 and also illumination of its respective indicator lamp 55 thru energization of the electro-magnet 52. As the switch arm 11 is swung forwardly into the angular slot 9, the plunger 22 is raised by the flexible cable 37 connecting the plunger and switch arm until the lift washer or stop 26 engages the under side of the annular piston 18 and unseats the valve head 25 from closing relation over the top of the opening 19 so that liquid in the upper part of the cylinder is free to pass thru the piston opening 19 and apertures 27 of the lift washer into the lower part of the compartment upon upward movement of the plunger and piston. As the switch arm 11 moves to the forward extremity of the angular branch 9, the plunger 22, together with the annular piston 18 has been raised to a position as shown in Figure 2. The operator then releases the switch arm and immediately after which the spring 28 will cause the valve head 25 to be moved downwardly into seating engagement with the valve seat 20 and thus shut off communication between the upper and lower portions of the cylinder thru the piston opening 19. After seating of the valve head 25 the spring 28 acts to force the plunger, together with the annular piston 18 downwardly in the cylinder 15 and whereupon the liquid below the piston is forced thru the by-pass 30 and regulating valve 31 into the upper portion of the cylinder. The restricted opening thru the valve 31 will cause slow movement of the liquid from beneath the piston and thus cause the piston to move downwardly with a slow motion while acting to withdraw the switch arm from the angular branch 9 into an off position at the rear of the main branch 8. The speed at which the piston 18 is allowed to recede in the cylinder 15 will determine the length of time that the contact ring 13 will act as a bridge between the contacts 40 and 44. Further closing of the control valve 31 will restrict the passageway thru the by-pass 30 and thus cause the contact ring 13 to remain for a longer period of time in bridging relation between the contacts 40 and 44 or 40 and 45 in accordance with which signal is being operated.

By so having the contacts 40, 44 and 45 so mounted upon the under side of the cover plate 6 it will be seen that ready access may be had to the switch box or casing since such an arrangement allows for the cover plate to be readily removed by first removing the knob 12 from the switch arm.

By so having the flexible connection 37 between the switch arm and return means D, such will enable the operator to readily shift the switch arm from one of the angular branches 9 or 9′ into the other angular branch should the operator change his mind as to the particular signal which he desires to display. That is, the flexible connection 37 will enable the operator to readily swing the switch arm to an off position for directing the switch arm into an opposite angular branch of the guide slot without a quick rearward movement of the switch arm in any way effecting the switch arm return means.

From the foregoing description it will be apparent that a novel and improved vehicle signal control switch has been provided embodying a novel arrangement for selectively completing circuits thru independent signals, and further including a novel arrangement whereby the signals will be maintained in an operative position for a predetermined period of time without further attention of the operator. It will further be apparent that a novel arrangement has been provided wherein the switch arm may be quickly swung to an off position by the operator when desiring but a short display of the signals.

Various changes may be made to the specific form of the invention herein shown and described, without departing from the spirit of the invention or the scope of the following claims.

I claim:

1. In a selective control switch for independent signal circuits, a casing provided with a guide slot having angularly extending branches communicating at one end with a main branch, spaced contacts extending longitudinally of each of the angular branches and terminating short of the main branch, a switch arm movable in the guide slot into either of said branches and acting to bridge the contacts of the angular branches when moved thereinto for completing a signal circuit, and means for returning the switch arm thru a retarded movement out of either of the angular branches into the main branch and out of bridging relation between the contacts of the angular branches.

2. A selective control switch for independent signal circuits comprising a casing provided with a Y-shaped guide slot forming a main branch having angularly extending branches at its forward end, spaced contacts extending longitudinally of each edge of the angular guide branches, a switch arm pivotally mounted in the casing and having its free end movable in the guide slot for bridging the contacts of the respective angular guide branches when moved thereinto and completing a signal circuit, return means mounted in the casing for returning the switch arm thru a retarded movement out of either of the angular guide branches into the main guide branch, and means operatively connecting the switch arm with said last mentioned means.

3. In a control switch for signal circuits, a casing, a pair of spaced elongated contacts mounted in the casing, a switch arm pivotally mounted in the casing and movable into bridging relation between the contacts, a closed chamber mounted in the casing, a plunger reciprocally mounted in the chamber and having a stem projecting from the chamber, spring means for normally urging the plunger inwardly of the chamber, means for retarding inward movement of the plunger under the action of said spring means, a bracket supported by the chamber and having sheaves mounted thereon, and a flexible cable trained over said sheaves with one end connected with the projecting stem of the plunger and its opposite end connected to said switch arm.

EDWARD A. WEINBRUNN.